April 7, 1936.        H. D. MORGAN        2,036,715
ARTIFICIAL DENTURE AND METHOD OF MAKING THE SAME
Filed May 13, 1930
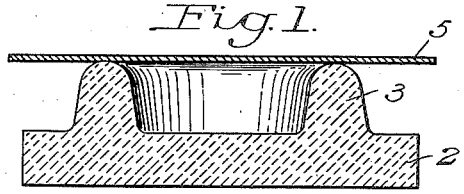
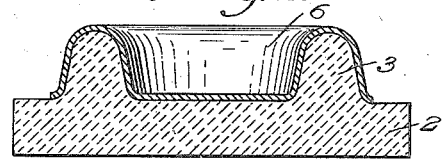
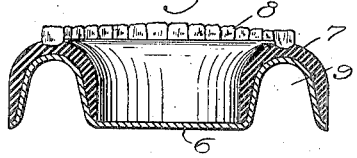
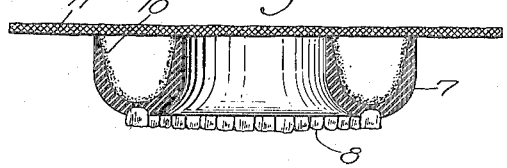
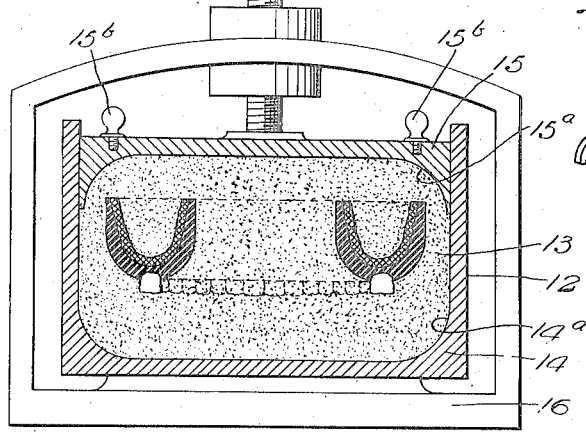
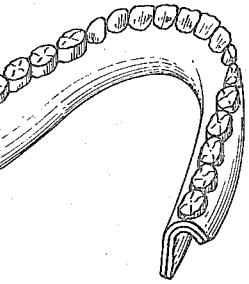
INVENTOR
Hugh D. Morgan
By Byrnes, Stebbins Parmelee & Blenko
His Attorneys Patented Apr. 7, 1936

2,036,715

UNITED STATES PATENT OFFICE 2,036,715

ARTIFICIAL DENTURE AND METHOD OF MAKING THE SAME

Hugh D. Morgan, Youngstown, Ohio

Application May 13, 1930, Serial No. 451,895

8 Claims. (Cl. 32—2)

This invention relates to artificial dentures and the method of making the same.

Artificial dentures as now generally constructed comprise a plate formed of a hard material, such as hard rubber, which plate carries the teeth and has a gum receiving recess therein conforming as closely as possible to the contour of the user's mouth. Such a denture has many well recognized defects. In the first place it is absolutely hard and rigid and cannot give or flex to any appreciable extent during mastication. Under some of the stresses of mastication this results in the suction which holds the plate in place being broken, allowing the plate to slip out of place. Such a denture also produces localized points of pressure, pinching the gums at some points and not making a good contact with them at others. The contour of the gums is constantly undergoing a change, and the denture cannot be adjusted to meet the changes in contour.

It has been proposed to remedy these defects in various ways by the use of soft rubber on the gum engaging portion of the denture. In my prior Patent No. 1,714,185 I have disclosed an artificial denture having an oversized gum engaging recess with a liner of soft rubber in the recess. The soft rubber, however, is in the form of a premolded strip. It is difficult to secure the strip satisfactorily in the denture because of the difficulty of eliminating wrinkles and getting the rubber to lie perfectly smooth in the denture and still adapt itself to the gum receiving recess of the denture and to the shape of the user's gum.

According to the present invention I propose to form a denture having an oversized recess therein, as disclosed in my prior patent, and to line this recess with a layer of rubber or rubber-like material, and thereafter mold this lining to conform to the user's gum. I have found that certain rubber compositions hold their form, but are resilient at body temperatures, but will become semi-plastic and deformable when heated to temperatures slightly above body temperatures. I prefer to line the gum engaging portion with such a rubber composition, thereafter mold this lining to conform generally to the contour of the user's mouth, and finally while the rubber is still in a deformable state, put the denture in the user's mouth and press it against the gum, actually molding the rubber in situ over the gum of the user. When the rubber cools to body temperature it conforms exactly to the gum so that a good suction exists for retaining the denture in place. At the same time this lining is sufficiently resilient to form an effective cushion between the denture and the gum of the user. Due to the fact that the rubber is actually molded in the user's mouth, the pressure is evenly distributed.

There are no points of irritation or places where a strangulation of the minute blood vessels which nourish the gums occurs. The slight resiliency of this lining allows the denture to adjust itself in the act of mastication and as a matter of fact chewing is more nearly like the chewing with natural teeth due to the fact that in the process of chewing, the natural teeth have a very slight movement in the gums.

The invention and the method of practicing the same may be more fully understood by reference to the accompanying drawing in which, Figure 1 represents a section through a model for a lower denture with a malleable plate laid across the model;

Figure 2 is a view similar to Fig. 1 showing the malleable plate swedged down over the model;

Figure 3 is a transverse section through a lower denture showing the manner in which the denture may be built up on the plate as a foundation;

Figure 4 is a view of the denture in Fig. 3 inverted and with the malleable plate removed, and showing a sheet of soft rubber across the top thereof prior to pressing the same into the gum receiving recess in the denture;

Figure 5 represents a section through a flask within a hand press, showing the denture embedded in sand under pressure; and Figure 6 is a perspective view of the completed denture.

In carrying out the invention a model of the user's mouth is first made in the usual manner. This is done by making a negative impression with plaster of Paris in the user's mouth, and from this negative a positive model, sometimes referred to as a "stone" model, is made. In Figure 1, 2 designates the model with a portion 3 corresponding to the user's gum. After the model has been prepared a thin plate of some workable material is shaped over the model. As shown in Fig. 1, I prefer to use a thin flat sheet of soft tin 5. This sheet of tin is swedged and burnished over the model, as shown in Fig. 2, the resulting plate being designated 6. This plate 6 is preferably of sufficient thickness to be self-supporting and to form a foundation on which the denture can be built up. Using the plate 6 as a foundation, the teeth are set up on it in wax just as they are now ordinarily set up on the model. The use of the plate 6 has the advantage that after the teeth are set up on it, the plate can be slipped into the user's mouth for a "try-in". After the operator has satisfied himself with the set-up by a "try-in", vulcanizing is proceeded with, the rubber plate being formed directly on the metal plate 6 without requiring further use of the model.

In Fig. 3 I have shown the vulcanite denture 7 over the swedged plate 6, the denture 7 carrying the artificial teeth 8. After the vulcanite plate or denture has been formed, the metal plate 6 is stripped from the denture. It will be seen that the gum receiving recess 9 in the denture will be oversize by an amount equal to the thickness of the plate 6. If the denture were placed in the mouth it would be loose on the user's gums.

After the removal of the plate 6 from the vulcanized denture, the denture is trimmed and the inner surface of the gum receiving portion 9 is coated with a cement, designated 10 in Fig. 4. A layer of the lining material 11 is also coated on the under face with rubber cement, and this lining material 11 is pressed down into the gum receiving portion of the denture. The lining material 11 is preferably slightly thicker than the metal plate. Moreover, it is preferably formed of a rubber-like material of a nature which will be resilient and hold its shape fairly well at body temperature, but which will become semi-plastic or deformable at a temperature not exceeding the boiling point of water, and preferably at a temperature at which the denture can be placed in the mouth. My invention does not contemplate the use of any particular rubber composition, as any having these properties may be used, although I have found certain compositions formed by a mixture of latex and balata to be particularly satisfactory, preferably without a vulcanizing agent. Such a rubber has the advantage that it will normally retain its shape in the denture, but being deformable at temperatures slightly above body temperatures, it can be heated to a very slight extent, and while hot, but not sufficiently hot to burn the user, pressed in the mouth and molded to conform to the gum of the user. One example of a suitable material of this class is that obtained by first separately milling and then milling together 20 parts of first latex crepe and 80 parts of deresinated balata. Gutta percha may be substituted for balata and any high grade rubber for the latex crepe. The proportions may be modified according to the softening temperatures of the different materials used.

After the layer of lining material has been pressed into the denture it is worked by hand to smooth out wrinkles and to be forced intimately into the groove. It is of course desirable that the sheet 11 be warmed before pressing it into the groove so that it may be worked about with the fingers and made to lie smoothly in the groove. After the sheet 11 has been fitted into the groove and cemented as well as can be by hand, the denture is placed in a flask which has been partially filled with sand, dry plaster, or like material, and the flask is then filled with sand to completely embed the denture. This is shown in Fig. 5 wherein the flask is designated 12, the sand filling 13, and 14 is the bottom of the flask. A second follower plate 15 is indicated at the top of the flask. The flask is placed in a press 16 and the follower plate 15 is pressed down on the sand or other dry granular material. The sand flows into all of the irregularities in the denture and presses the rubber liner against the denture. This operation is performed before the cement has set, and the denture is preferably left under pressure for three or four hours, or until the solvents and volatile materials have disappeared from the cement. Because the sand offers a considerable resistance to flowing under pressure, I have found that greatly superior results can be obtained by the use of an inclined or curved filet 14$^a$ around the bottom of the flask, and a similar filet 15$^a$ on the cover plate. This serves to direct the flow of sand in the flask in such a way as to increase the pressure on the denture, particularly certain parts thereof, to an extent which cannot be obtained where the corners of the flask are left square. Another advantage is that the volume of sand is reduced, and the contour of the denture is brought closer to the metal body of the flask. Because of the friction which the sand offers to flowing under pressure, it is obviously advantageous to bring the metal into closer proximity to the plate and thus reduce the amount of sand. The cover plate 15 is provided near the outer edge thereof with one, or preferably two, small knobs 15$^b$, by means of which the operator, after filling the mold with sand, may rotate the follower plate back and forth through a slight arc to work the sand down into the flask before putting the flask in the press.

The denture is then removed from the flask, brushed and cleaned, and then either held in steam or immersed in hot water, or otherwise heated by a dry heat but not sufficiently to injure the rubber and until the liner 11 has become fairly workable. The denture is then fitted onto the model 3 and the soft rubber liner molded to conform more or less exactly to the contour of the user's mouth.

The denture is then ready for the final fitting in the user's mouth. In fitting the denture it is again heated to a point where the rubber liner 11 is deformable, but not to an extent sufficient to burn the user, and the denture is placed in his mouth. The operator with his fingers and the user with his tongue and by biting, presses the denture against the gum and molds the liner 11 exactly to the contour of the gum. If desired the step of initially molding the liner on the model 11 may be eliminated and all of the molding and shaping of the liner 11 effected in the user's mouth.

After the operator has satisfied himself that the denture is correct, the denture is left in the mouth and the patient discharged with instructions to return at an early date. After a short usage the patient may return, and if the denture is not fitting as it should, or there has been some change in the contour of the patient's mouth, the denture is immersed in warm water for a minute or so and then placed in the patient's mouth and the liner re-molded to adjust itself.

The invention can be carried out just as easily as the manufacture of the ordinary denture, and due to the fact that the final fitting and shaping of the denture is completed directly in the user's mouth, the work of forming the vulcanite plate does not need to be so exacting. The use of the thin plate 6 as a foundation on which the denture is built up is more convenient to the dentist than the use of the stone model, and enables a preliminary try-in to be made while the teeth are set up in wax, but while the wax is firmly supported on the metal.

The shaping of the liner in place in the patient's mouth eliminates a great deal of exacting work on the part of the dentist, and the lining material being resilient, forms a cushion which eliminates most of the discomfort caused by artificial teeth, particularly when they are new. Due to the fact that the liner may be re-shaped from time to time, it is not necessary for the dentist to make a preliminary set of teeth to be used immediately after the removal of the natural ones and until the gum has readjusted itself, as the liner can be molded from time to time to take care of the readjustment and change in the patient's mouth.

The invention therefore not only provides a cushion lining for the vulcanite plate, but provides a denture which can be fitted in situ in the mouth to conform exactly to the patient's gum and the whole operation of making an artificial denture is relieved of much of the tedious labor heretofore necessary.

I have described the invention specifically in the manufacture of a lower denture, but the same procedure is followed in making an upper denture. The invention is applicable to partial dentures, such as removable bridges, and the term "denture" as herein used shall be understood to include such devices.

While I have specified certain preferred materials, it will be understood that the invention is not restricted to the particular materials disclosed, and in making the gum receiving recess oversize, paper may be used as disclosed in my said patent, in place of metal or other malleable material, and various other variations may be made in the exact procedure herein specifically described and within the scope and contemplation of the following claims.

I claim:

1. An artificial denture comprising a rigid plate having a gum receiving recess therein and a lining cemented in the recess comprised of a rubberous material which is elastic at body temperature but which softens within 50° F. above a body temperature.

2. An artificial denture comprising a rigid plate having a gum engaging portion covered with a lining cemented therein of a rubber containing resilient substance which retains its shape at body temperature but which is sufficiently plastic to be molded when heated above body temperature and below the point where it will burn the body tissue.

3. An artificial denture comprising a plate having a gum engaging portion, said portion being covered with a lining of a rubber-containing material which can be molded to shape after the denture has been inserted in the user's mouth, said lining being slightly resilient at body temperature and being semi-plastic at a temperature above body temperature but below which it will burn the user's mouth.

4. In the manufacture of artificial dentures, the steps which comprise forming a model of the user's mouth, shaping a thin plate of malleable material over the model, building up a permanent denture on the plate, removing the plate from the denture, coating the gum receiving portion of the denture with a cement, placing a layer of lining material into the gum receiving portion, encasing the denture with the lining in sand and subjecting the sand to pressure to thereby intimately cement the lining to the denture, and thereafter shaping the lining to conform to the user's mouth.

5. The method of fitting artificial dentures to the user's mouth which comprises forming a denture having an oversized gum receiving recess therein, lining the recess with a rubber composition which is resilient and elastic at body temperature but deformable at a temperature slightly above body temperature and below the temperature at which it will burn the user's mouth, and shaping this lining to conform to the user's mouth by placing the denture in the user's mouth while said lining is in a deformable state.

6. The method of securing a sheet rubber lining in the gum receiving portion of an artificial denture which comprises interposing a cement between the denture and a layer of rubber lining material, pressing the layer into the gum receiving portion of the denture by hand, thereafter embedding the denture in dry granular material and subjecting the dry granular material to pressure for a length of time sufficient for the cement to set.

7. In the method of making an artificial denture, the step which comprises cementing a liner onto a portion of the denture, then embedding the denture in a dry granular material, and thereafter subjecting the material to pressure.

8. In the manufacture of artificial dentures, the steps which comprise cementing a liner to a portion of a denture, thereafter, before the cement has finally set, embedding the denture in a dry granular material, subjecting the material to pressure, and maintaining the pressure on the material until the cement has completely set.

HUGH D. MORGAN.